United States Patent [19]

Mikoshi et al.

[11] Patent Number: 4,828,451
[45] Date of Patent: May 9, 1989

[54] INDUSTRIAL ROBOT

[75] Inventors: Tadafumi Mikoshi, Osaka; Hitoshi Oka, Takatsuki; Akira Fukuda, Osaka, all of Japan

[73] Assignee: Daikin Industries, Ltd., Osaka, Japan

[21] Appl. No.: 81,744

[22] Filed: Aug. 5, 1987

[30] Foreign Application Priority Data

| Aug. 7, 1986 [JP] | Japan | 61-185591 |
| Aug. 7, 1986 [JP] | Japan | 61-185592 |
| Aug. 7, 1986 [JP] | Japan | 61-185593 |
| Aug. 7, 1986 [JP] | Japan | 61-185594 |
| Aug. 14, 1986 [JP] | Japan | 61-191275 |
| Aug. 20, 1986 [JP] | Japan | 61-196214 |

[51] Int. Cl.$^4$ .................................. B25J 9/06
[52] U.S. Cl. .................................. 414/680; 414/735; 901/15; 901/28
[58] Field of Search ................. 414/680, 735; 901/23, 901/24, 25, 26, 15, 28, 29

[56] References Cited

U.S. PATENT DOCUMENTS 3,922,930  12/1975  Fletcher et al. .................. 901/26 X
4,308,584  12/1981  Arai .................................. 901/15 X

*Primary Examiner*—Frank E. Werner
*Assistant Examiner*—Donald W. Underwood
*Attorney, Agent, or Firm*—Stevens, Davis, Miller & Mosher

[57] ABSTRACT

An industrial robot provided with at least six joints and adapted to have at least six degrees of freedom, wherein rotational joints rotatable around axes extending lengthwise of the arm and bending joints swingable around perpendicular axes extending perpendicularly to the lengthwise direction of the arm, thereby enabling the position and attitude control for a wrist at the arm and the obstacle avoiding control to change height of an elbow portion at the arm so as to avoid the obstacle.

8 Claims, 7 Drawing Sheets

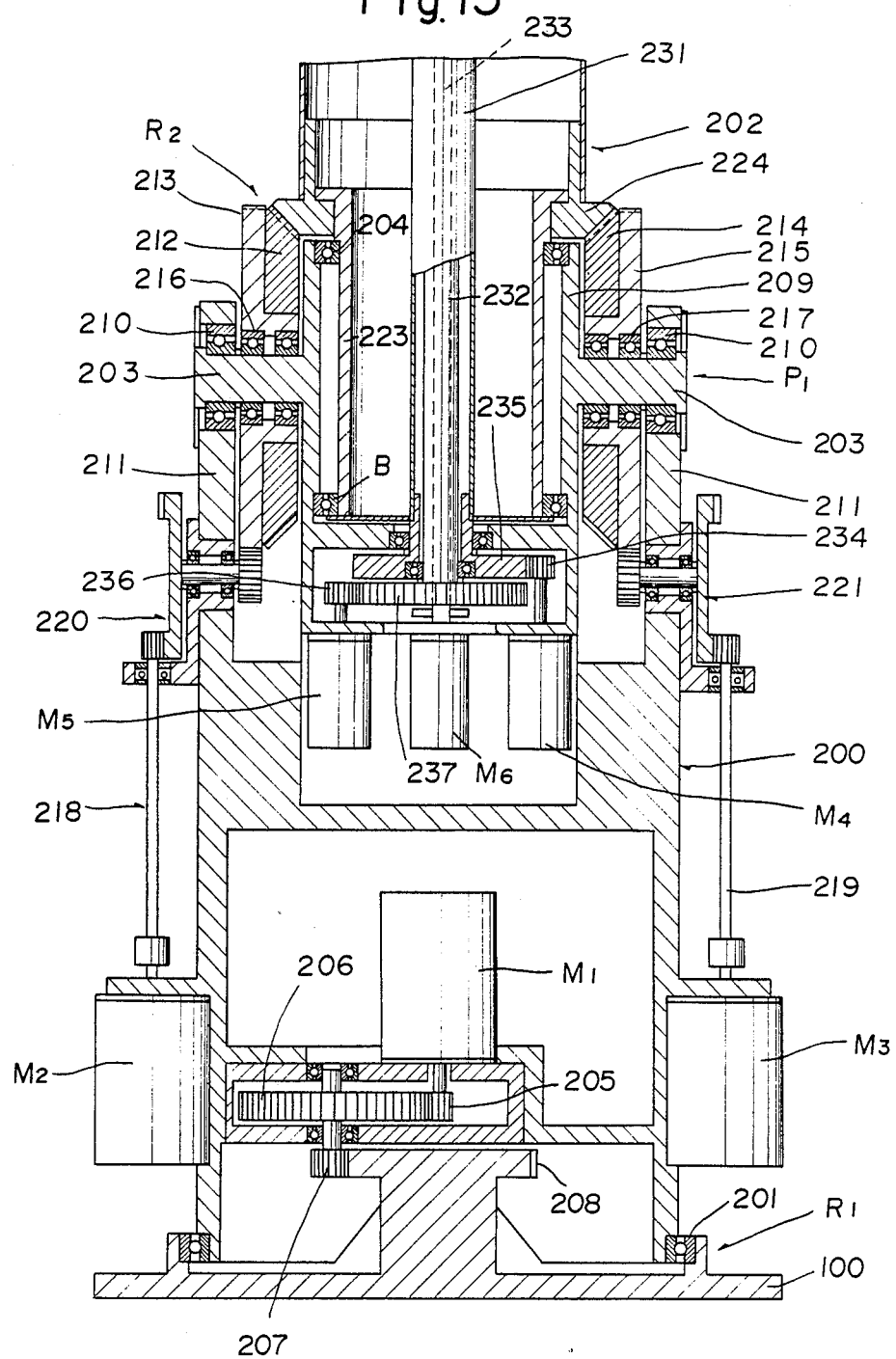

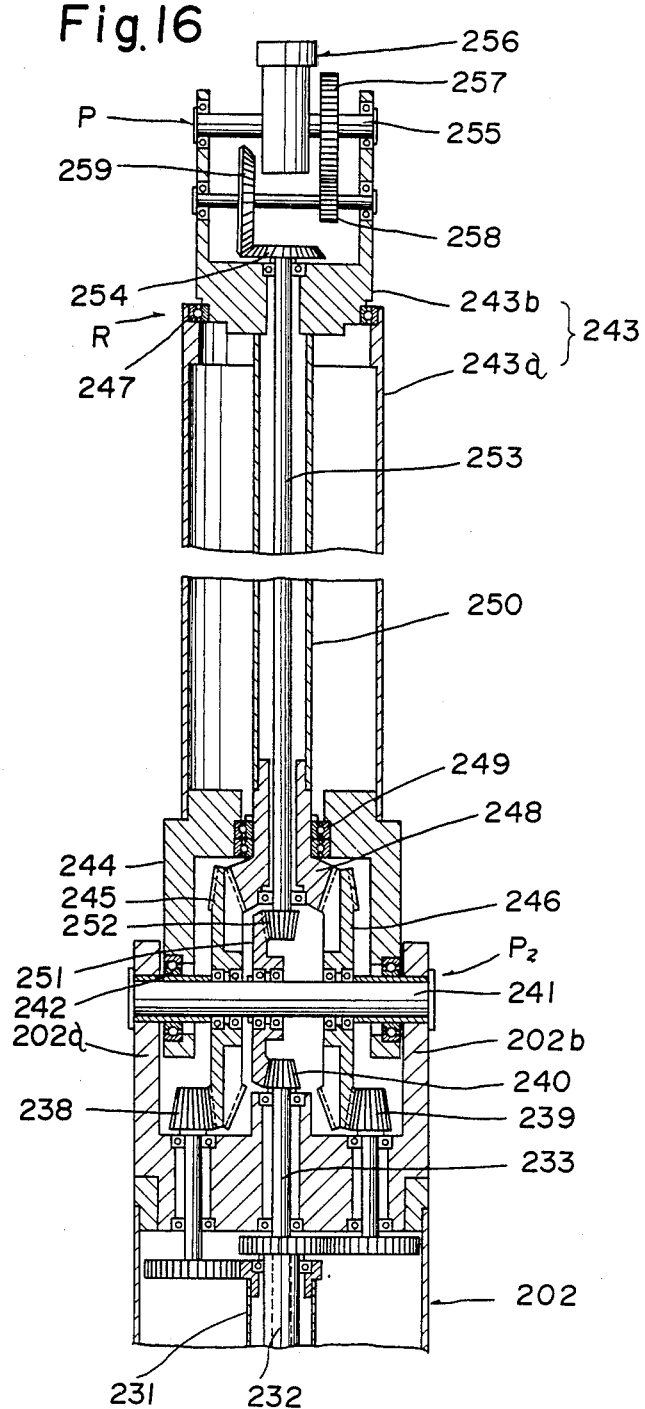
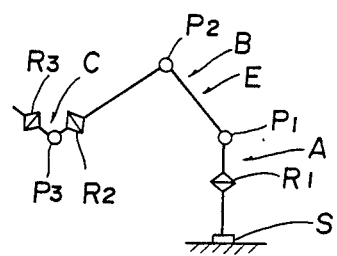
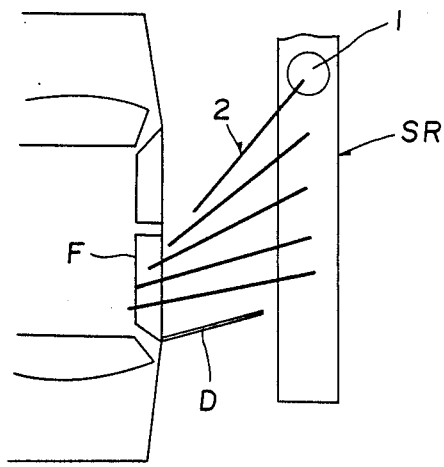
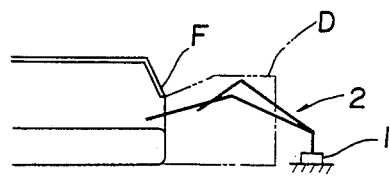

INDUSTRIAL ROBOT

FIELD OF THE INVENTION

The present invention relates to a multipurpose industrial robot used for welding, fusing, sealing, adhesive coating, deburring, tube expanding, polishing, screw tightening, parts assembly or the like.

BACKGROUND OF THE INVENTION

This kind of industrial robot has hitherto been so constructed that, for example, as shown in FIG. 17, at an intermediate portion of an arm E or manipulator supported to a base S are provided three first, second and third rotational joints $R_1$, $R_2$ and $R_3$ rotatable around the shaft extending lengthwise of the arm E and three first, second and third bending joints $P_1$, $P_2$ and $P_3$ swingable around the shafts perpendicular to the longitudinal direction of the arm E, these joints being disposed from the base S to the utmost end of the arm E in the order of the first rotational joint $R_1$, first bending joint $P_1$, second bending joint $P_3$, second rotational joint $R_2$, third bending joint $P_3$, and third rotational joint $R_3$.

The first through third rotational joints $R_1$, $R_2$, and $R_3$ rotate around the shaft at the arm E and the first through third bending joints swing around the shafts perpendicular to the arm E respectively, thereby controlling the position and attitude of a working machine mounted on the utmost end of the arm E for carrying out various works.

For the convenience of explanation, in a robot shown in FIG. 17, a portion extending from the base S to the first bending joint $P_1$ is called a trunk A, that from the first bending joint $P_1$ to the second rotational joint $R_2$, an elbow B, and that from the second rotational joint $R_2$ to the utmost end of arm 2, a wrist C.

The trunk A can rotate its upper half portion with respect to its lower half portion through the first rotational joint $R_1$, the elbow B can change its angle with respect to the trunk A and an angle of the rear half portion of the elbow B with respect to the front half portion thereof, and the wrist C can obtain three degrees of freedom by the second rotational joint $R_2$, third bending joint $P_3$ and third rotational joint $R_3$, so that the utmost end of the arm E can obtain six degrees of freedom, whereby the working machine is controllable accurately of the position and attitude thereof by the six degree of freedom.

In this case, however, the trunk A, elbow B and wrist C, when the utmost end of arm E is controlled, is somewhat restricted.

In detail, when the utmost end of the arm E is fixed in the position and direction, the elbow B, even when intended to move, is restricted by the first and second bending joints $P_1$ and $P_2$ to result in that a change in an angle of the elbow B with respect to the trunk A and that between the front half portion at the elbow B and the rear half portion thereof are not at all performable. Moreover, it is quite impossible to bring down the elbow B to change its height. In brief, in a case where two or more bending joints $P_1$ and $P_2$ are continued and no rotational joints are provided therebetween, the elbow B, when the utmost end of the arm E is fixed in the position and direction, is restricted in motion, whereby it is impossible to desirably swing the elbow B in the three dimensional space.

Accordingly, the working machine at the utmost end of the arm E, when inserted into a narrow work space to carry out various works, is restricted thereto.

For example, when a welder mounted on the utmost end of the arm E, as shown in FIGS. 18 and 19, is inserted into an automobile through a door D for carrying out a welding work therein, even if an obstacle, such as a door frame F, is in front of the inserted arm E, it is quite impossible to change the height of the elbow to avoid the obstacle. After all, an intermediate portion of the arm E comes into contact with the obstacle, thereby making impossible the insertion of the arm E into the automobile.

Therefore, in the aforesaid industrial robot, as shown in FIGS. 18 and 19, a service rail SR is provided in parallel to the assembly processing line for the automobile and the base S is slidably supported to the service rail SR, so that the base S is slide from one lengthwise side of the service rail SR from the other side, and the arm E is inserted into the automobile while sequentially controlling the position and attitude of the arm E as shown sequentially in the drawings.

However, such service rail SR, when used for various works, is expensive to install and requires a large installation space.

SUMMARY OF THE INVENTION

In the light of the above the problem, the present invention has been designed. An object thereof is to provide an industrial robot which has an arrangement of the rotational joints and bending joints provided at an arm or manipulator so that, in a case where six or more joints are used, even when bending joints at both ends among three optionally continuing bending joints not in alignment are fixed in position, the intermediate bending joint can desirably be selected in position, and even if any obstacle exists during the working, the robot can avoid the obstacle without using the service rail, whereby the robot of the invention can be installed in a restricted space, is inexpensive to produce, and is capable of carrying out various tasks.

The industrial robot of the present invention has at least six shafts joints and at least six degrees of freedom and is provided with a base and an arm supported thereon, the arm being provided with rotational joints each rotatable around the shaft extending lengthwise of the arm and bending joints swingable each around a shaft perpendicular to the shaft of the arm. The present invention is characterized in that the rotational joints and bending joints are disposed alternately to each other.

The arm is provided with at least three first through third rotational joints, at least three first through third bending joints, and at least four first through fourth links each comprising a wrist, an elbow and a trunk, the first rotaitonal joint being disposed between the base and the first link, each bending joint being disposed between the respective links, the second and third rotational joints being disposed at the second and third links respectively, and the arm enabling the elbow to be changed in height to avoid an obstacle.

The rotational joints and beinding joints are disposed alternately with each other so that even when bending joints at both ends of the arm among three optional ones in continuation but not in alignment are fixed in position, the intermediate bending joint is desirably selected in position.

In addition, in the present invention, part of the arm from the base to the first bending joint positioned nearest thereto is called the trunk, that from the first bending joint to the third rotational joint, the elbow, and that from the third rotational joint to the utmost end of the arm, the wrist. Now, when explanation is further given on the arm provided with the six shafts joints, the utmost end of the wrist can obtain six degrees of freedom by the three rotational joints and three bending joints, thereby enabling the working machine at the utmost end of the wrist to be controlled in position and attitude. Also, even when the utmost end of the wrist is fixed in the position and direction, the elbow is swingable from the standing position in FIGS. 3 and 4 toward the sideways falling position as shown in FIGS. 5 and 6. In other words, in the standing position of the elbow, the utmost end of the arm is fixed in the position and direction so that when, for example, the first and second rotational joints are rotated in the directions of the arrow and the first bending joint is swung, the elbow falls to this side in FIG. 3 and downwardly in FIG. 4. Hence, the elbow, as shown in FIGS. 5 and 6, becomes smaller in height $H_2$ in FIG. 5 than that $H_1$ in FIG. 3.

All the joints are moved in cooperation with each other so that the utmost end of the arm can maintain constant the position and direction thereof while desirably changing the height of the elbow. Thus, the position and attitude of the utmost end can accurately be controlled by the six degrees of freedom and the arm can be given another degree of freedom while maintaining the position and direction thereof.

Accordingly, even when any obstacle exists in front of the arm moving for various works, the arm can avoid the obstacle by changing the height of the elbow while it is controlled acurately by six degrees of freedom.

The present invention is further characterized by providing a command means for commanding to a driving means for each joint the motion of the arm to avoid the obstacle and a changing means for changing the height of the elbow at the arm decided by the command means.

The command means can control the arm in accordance with a control path on the basis of teaching data previously taught while avoiding the obstacle, and even when the obstacle exists on the control path, the height of the elbow is changed only, thereby avoiding the obstacle.

The present invention is further characterized by providing a detection means for detecting a load larger than a rated load of a motor for driving each joint, a motor control means for lowering an output of a heavy load motor on the basis of the detection result by the detection means, and a track correction means which corrects a moving path of each joint on the basis of the motor output control so as to maintain substantially constant the moving path of the utmost end of the wrist.

The arm, even when using the six shafts joints, can act to control the position and attitude of the working machine at the utmost end of the wrist of the arm and can turn the elbow through a change in the height of elbow at the arm. Moreover, when the detection means detects an excessive load on the motor, the motor output control means lowers the output of the heavy load motor and the track correction means corrects the disturbed path of movement of the utmost end of the wrist caused by the low output of the heavy load motor.

The present invention is further characterized in that the rotational joints and bending joints are disposed alternately with each other so as to enable the position and attitude control at the wrist of the arm and the obstacle avoiding control by changing the height of the elbow and the robot of invention is provided with a first control means for controlling each joint in a position and attitude mode, a second control means for controlling each joint in an onstacle avoiding control mode, and a selection means for selecting the first and second control means.

Thus, even when the arm includes six shafts joints, the first control means can selectively control the normal position and attitude and the second control means can similarly control avoidance of obstacle only by using six control parameters respectively.

These and other objects of the invention will become more apparent in the detailed description and examples which follow.

BRIEF DESCRIPTION OF THE DRAWINGS

FIGS. 3 through 6 are illustrations of operation of the robot, in which FIG. 3 is a side view of the robot prior to operation, FIG. 4 is a plan view of the same, FIG. 5 s a side view after operation of the robot, FIG. 6 is a plan view of the same, FIG. 15 is a longitudinal sectional view of the embodiment of the invention showing a first rotational joint, a first bending joint and a second rotational joint, FIG. 16 is a longitudinal sectional view of the embodiment of the invention showing a second bending joint, a third rotational joint and a third bending joint, FIG. 17 is a skeleton view of the conventional industrial robot, and FIGS. 18 and 19 show a welding work condition in an automobile by use of the conventional example.

DETAILED DESCRIPTION OF THE INVENTION

Figure 1:
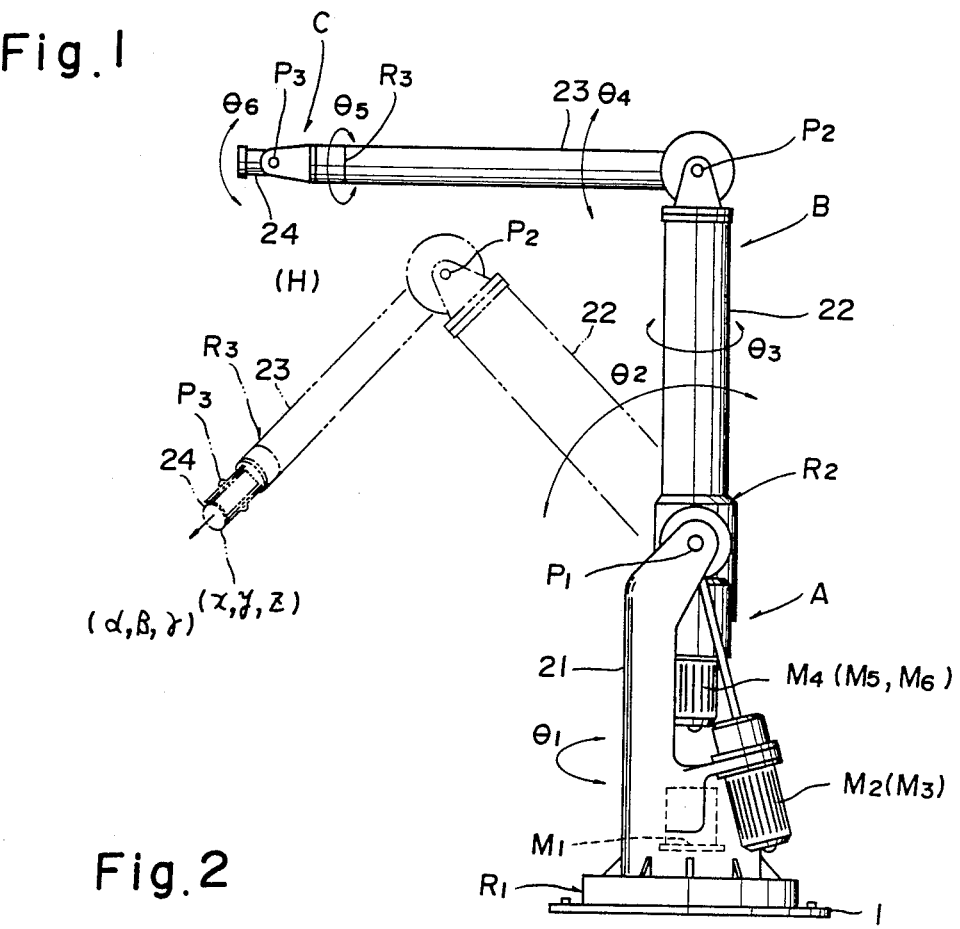
FIG. 1 is a side view of an embodiment of an industrial robot of the invention.
Figure 2:
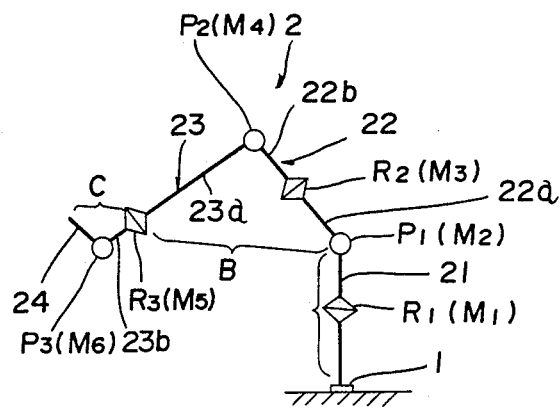
FIG. 2 is a skeleton view explanatory of the principle of the robot in the FIG. 1 embodiment.

Referring to FIGS. 1 through 6, an embodiment of an industrial robot of the present invention provided with six shafts joints of three first through third rotational joints $R_1$, $R_2$ and $R_3$ and three bending joints $P_1$, $P_2$ and $P_3$ shown.

In FIGS. 1 through 6, reference numeral 1 designates a base for supporting an arm 2 of a predetermined length, the arm 2 being provided with the first through third rotational joints $R_1$, $R_2$ and $R_3$ rotatable around an axis a, i.e., the shafts a extending lengthwise of and in parallel to the arm 2 and the first through third bending joints $P_1$, $P_2$ and $P_3$ swingable around an axis b, i.e., the shafts b perpendicular to the lengthwsie direction of the arm 2 respectively.

The first through third rotational joints $R_1$, $R_2$ and $R_3$ and the first through third bending joints $P_1$, $P_2$ and $P_3$ are disposed alternately with each other, thereby giving to the arm 2 one degree of freedom other than the six degrees of freedom with respect to the position and attitude of the utmost end of the arm 2.

In addition, the joints, as shown in FIGS. 15 and 16, are driven by use of motors $M_1$ through $M_6$ respectively.

The arm 2, as seen from FIG. 1, comprises substantially four first through fourth links 21, 22, 23 and 24. Between the first link 21 and the base 1 is provided the first rotational joint R rotatable around the parallel shaft a extending lengthwise of the first link 21, between the first link 21 and the second link 22 is provided the first bending joint $P_1$ swingable around the perpendicular shaft b, and at an intermediate portion of the second link 22 is provided the second rotational joint $R_2$ rotatable around the shaft a extending in parallel to and lengthwise of the arm 2.

Between the second link 22 and the third link 23 is provided the second bending joint swingable around the shaft b perpendicular to the lengthwise directions of the second and third links 22 and 23, at an intermediate portion of the third link 23 is provided the third rotational joint $R_3$ rotatable around the shaft a extending in parallel to and lengthwise of the third link 23, and between the third link 23 an the fourth link 24 is provided a third bending joint $P_3$ swingable around the shaft b perpendicular to the lengthwise directions of the third and fourth links 23 and 24.

In other words, as shown in FIG. 1, the arm 2 comprises substantially four first through fourth links 21 through 24, the first bending joint $P_1$ is provided at a connecting portion of the first link 21 and the second link 22, the second rotational joint $R_2$ is provided at an intermediate portion of the second link 22, the second bending joint $P_2$ is provided at a connecting portion of the second link 22 and the third link 23, the third rotational joint $R_3$ is provided at an intermediate portion of the third link 23, the first rotational joint is provided between the base 1 and the first link 21, and the third bending joint $P_3$ is provided between the third link 23 and the fourth link 24. The respective joints constitute six shafts joints.

For the convenience of explanation, part of the second link 22 between the first bending joint $P_1$ and the second rotational joint $R_2$ is called a front half 22a of the same, part of the same between the second rotational joint $R_2$ and the second bending joint $P_2$ is called a rear half of 22b of the same, part of the third link 23 between the second bending joint $P_2$ and the third rotational joint R is called a front half 23a of the same, and part of the third link 23 between the third rotational joint $R_3$ and the third bending joint $P_3$, a rear half 23b of the same.

Next, explanation will be given on operation of the robot constructed as described above.

In addition, as the above-mentioned, an arm 2 from the base 1 to the first bending joint is called a trunk A, that between the first bending joint $P_1$ to the third rotational joint $R_3$, an elbow B, and that from the third rotational joint $R_3$ to the utmost end of the fourth link 24, a wrist C. In such construction, the utmost end of the wrist C can accurately control the position and attitude thereof by means of the six degrees of freedom caused by the six shafts joints.

Also, the above construction can control the elbow B in height while keeping the position and direction of the utmost end portion of the arm 2.

Figure 3:
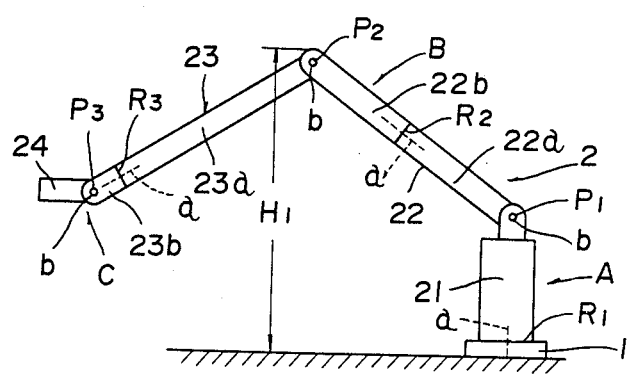
Figure 4:
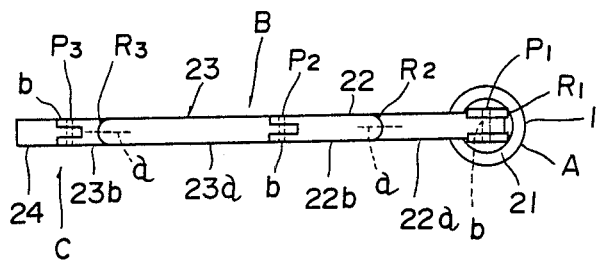

In other words, referring to FIGS. 3 and 4, the elbow B is $H_1$ in height from the floor. In this state, the first rotational joint $R_1$ and second rotational joint $R_2$ are rotatably driven in the directions of the arrow in FIGS. 5 and 6, the first bending joint $P_1$ is swung, and the joints $P_2$, $R_3$ and $P_3$ are moved in cooperation with each other, whereby the elbow B is swung as shown in FIGS. 5 and 6 without changing the utmost end of the wrist C in the position and direction so as to be changed in height from $H_1$ in FIG. 3 to $H_2$ shown in FIG. 5.

Figure 5:
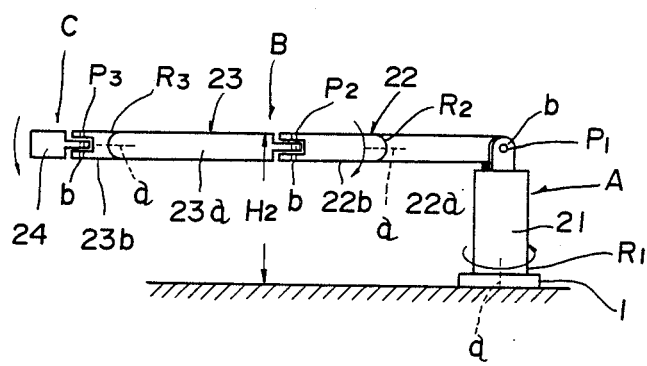
Figure 6:
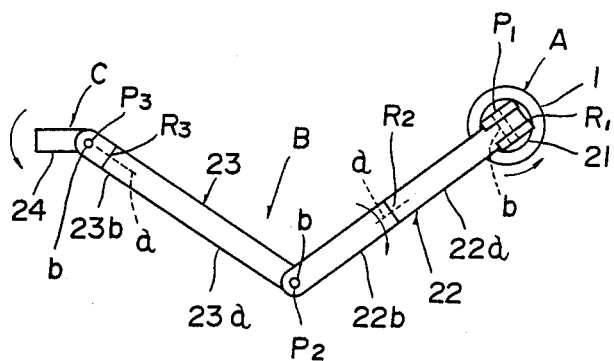

In greater detail, the rotations of the first and second rotational joints $R_1$ and $R_2$ allow the first link 21 to rotate in the directions of the arrow in FIGS. 5 and 6 and the rear half 22b of the second link 22 to rotate with respect to the front half 22a thereof, and the second and third links 22 and 23 turn while swinging the first bending joint $P_1$, in which a relative angle between the second link 22 and the third link 23 shown in FIG. 3 is not changed. In other words, the utmost end of the wrist C does not change in the position and direction.

Thus, the elbow B, when the utmost end of the wrist C is fixed in position, is controllable of its attitude from the standing position shown in FIGS. 3 and 4 to the sideways falling position as shown in FIGS. 5 and 6, thereby giving to the arm 2 the degree of freedom to change the height of elbow other than the position and direction of the utmost end of the arm.

In greater detail, the above operation is as follows:

(1) The first link 21 rotates at an angle of $\theta_1$ around the vertical shaft of the base 1 through the first rotational joint $R_1$.

(2) The second link 22 swings at an angle of $\theta_2$ around the shaft perpendicular to the lengthwise direction of the first link 21 through the first bending joint $P_1$.

(3) The rear half 22b of the second link 22 rotates with respect to the front half 22a thereof at an angle of $\theta_3$ around the shaft extending in parallel to and lengthwise of the second link 22.

(4) The third link 23 swings at an angle of $\theta_4$ around the shaft perpendicular to the lengthwise direction of the second link 22 through the second bending joint $P_2$.

(5) The rear half 23b of the third link 23 rotates with respect to the front hald 23a at an angle of $\theta_5$ around the shaft extending in parallel to and lengthwise of the third link 23.

(6) The fourth link 24 rotates at an angle of $\theta_6$ around the shaft perpendicular to the lengthwise direction of the third link 23 through the third bending joint $P_3$.

Thus, the wrist C has six degrees of freedom with respect to the base 1 and is controllable in the optional position (the orthogonal coordinates X, Y and Z) in the three-dimensional space and also in the optional attitude (turning components $\alpha$, $\beta$ and $\gamma$).

Moreover, even when the first and third bending joints $P_1$ and $P_3$ at both ends are fixed, the middle bending joint $P_2$ can optionally be selected in position so that the second bending joint $P_2$, in other words, the elbow B at the robot, is swingable around the line connecting the shafts of the first and third bending joints $P_1$ and $P_3$.

Hence, the robot can be controlled to change the height of the elbow B at the arm 2 to avoid the obstacle as well as it controls by the six degrees of freedom the position and attitude of the wrist C.

Next, explanation will be explained on the welding work, for example, in the automobile carried out by use of the robot of the invention constructed as the above-mentioned.

Figure 7:
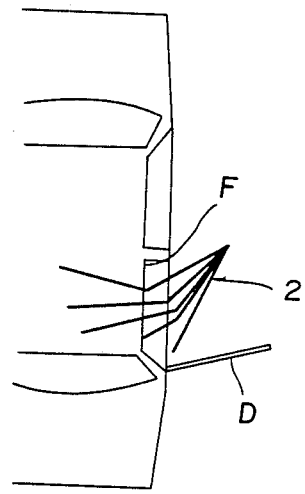
FIGS. 7, 8 and 9 are illustrations showing a welding work at the interior of an automobile.
Figure 8:
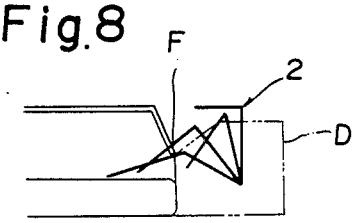

Referring to FIGS. 7 and 8, the industrial robot is disposed laterally of the assembly line for the automobile, the arm 2 is inserted therein, and an operating tool mounted on the utmost end of the fourth link 24 carries out the welding work for the interior of the automobile. In this case, when a frame F of a door D makes an obstacle for insertion of the arm 2, one degree of freedom given to the elbow B is used to swing and fall sidewise of the insertion direction of the arm 2 as shown by the solid lines in FIGS. 7 and 8, thereby avoiding the obstacle of frame F.

Figure 9:
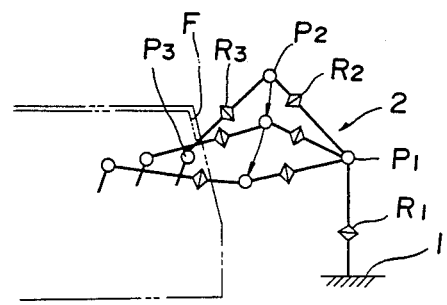

In detail, as seen from FIG. 9, the elbow B at the arm 2 is swingably controlled by the degree of freedom laterally of the insertion direction of the arm 2, thereby changing the height of the elbow B to avoid the frame F and inserting the arm 2 into the automobile. Thus, while controlling by the six degrees of freedom the position and direction of the arms 2 and the height of the elbow B, the welding work is carried out by use of the operating tool.

Also, the aforesaid swingable control of the elbow B can open or close the door D by use of the arm 2. Other than the aforesaid works, the work in a restricted space in, for example, an engine room is possible. Furthermore, the elbow B is made laterally swingable and each joint at the arm 2 is given a command for an angle to minimize energy consumption, thereby enabling the various works to be carried out by the minimum energy consumption.

The aforesaid embodiment is not limited to the use of six shafts joints, but may be applicable to a robot using, for example, seven or more shafts joints. In either case, in these multi shafts joints, even when the bending joints at both ends among the three continued bending joints not in alignment are fixed, the middle bending joint can optionally be selected in position.

Figure 10:
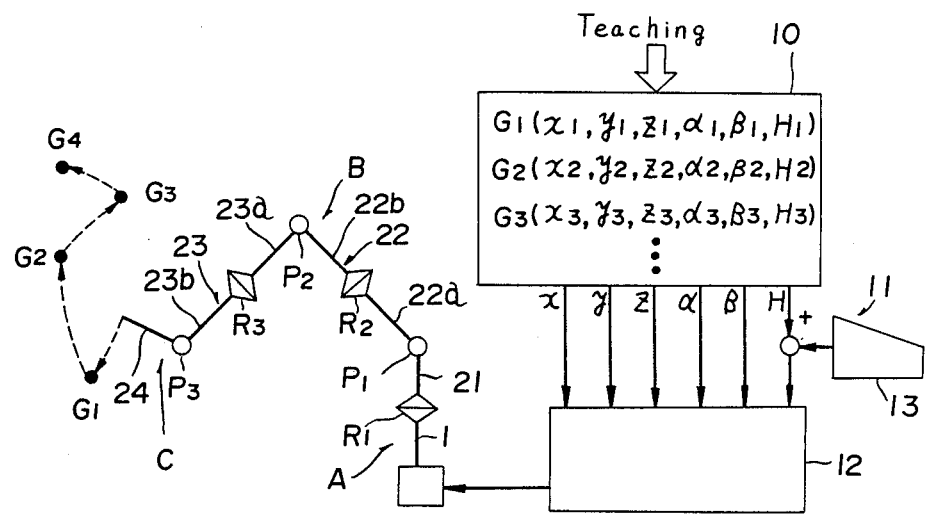
FIG. 10 is an illustration of the embodiment of the invention provided with command means for a motor driving each joint and with changing means.

Now, referring to FIG. 10, a control unit for drive-controlling the six shafts robot constructed as the above-mentioned is shown, which is provided with a command means 10 to command the respective joints $R_1$, $P_1$ through $R_3$, $P_3$ to operate to avoid the obstacle and a changing means 11 for changing a signal of height of arm elbow generated from the command means 10.

The command means 10 stores as the teaching data the positions X, Y and Z of the wrist C at a plurality of representing points $G_1$, $G_2$, $G_3$ ... $G_n$, two factors: the directions $\alpha$ and $\beta$ among the attitudes $\alpha$, $\beta$ and $\gamma$ or the wrist C, and the height H of the elbow B, that is, $G_1 (X_1, Y_1, Z_1, \alpha_1, \beta_1$ and $H_1)$, $G_2 (X_2, Y_2, Z_2, \alpha_2, \beta_2$ and $H_2)$, $G_3 (X_3, Y_3, Z_3, \alpha_3, \beta_3$ and $H_3)$, $G_n (X_n, Y_n, Z_n, \alpha_n, \beta_n$ and $H_n)$, the teaching data being commanded to a drive-control apparatus 12 for motors $M_1$ and $M_2$.

The drive-control apparatus 12 sets a rotation angle or a swing angle $\theta_1$ through $\theta_6$ of each joint, the wrist C being controlled on the predetermined control path so as to maintain the representing points $G_1$ through $G_n$.

One factor ($\gamma$ in the aforesaid embodiment) of the attitudes $\alpha$, $\beta$ and $\gamma$ of the wrist C can be decided to the swivel component around the shaft extending lengthwise of the wrist C, whereby the teaching data added with the elbow's height H instead of the factor is used as the control command for avoiding the obstacle, besides this, the data is usable as a control command during the actual work, such as a sealing work.

In other words, an operating member, such as a sealing gun, when only the two attitude components of the direction are decided, has no relation with rotation in the axial direction (the sealing gun merely rotates around the shaft during the operation). Thus, as far as the operating member is used, the teaching data may also be used as the control command during the operation.

On the other hand, in a case where an operating member required to decide three attitude components is used, the operating member approaches an object while avoiding the obstacle by the teaching data added with the height H of the elbow, so that during the actual operation after reaching the object, the data x, y, z, $\alpha$, $\beta$ and $\gamma$, which is added with instead of elbow height H, performs the attitude connection.

Next, explanation will be given on the changing means 11. The changing means 11 is in association with an input unit 13 attached to the robot body, the input unit 13 on-line-changes and elbow height signal H from the command means 10, thereby teaching a path avoidable of the obstacle to the elbow B without breaking the path of the wrist C.

In addition, when the input unit 13 on-line-changes the height H of the elbow, the changed data may be stored in a memory at the command means 10.

Also, the input unit 13 uses, for example, a keyboard or a joy stick of teaching pendant.

Thus, even when any obstacle exists on the control path on the basis of the preteaching data, the changing means 11 changes the elbow height H only, thereby avoiding the obstacle with ease.

Figure 11:
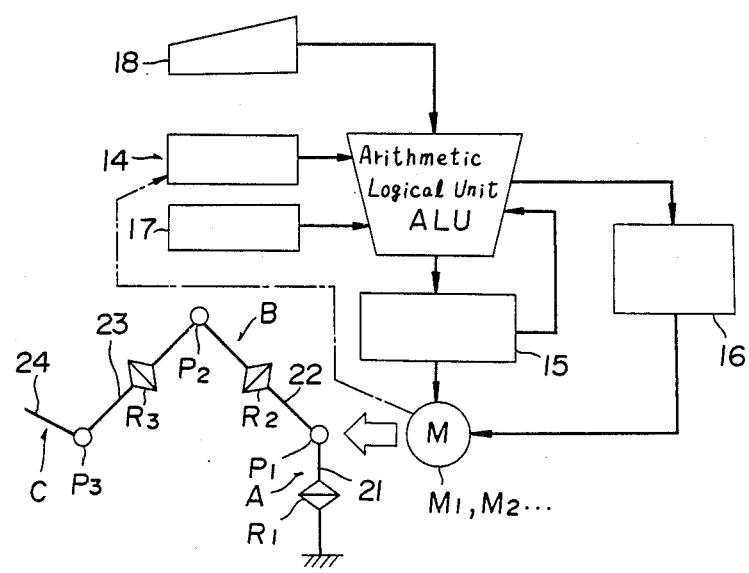
FIG. 11 is an illustration of the embodiment of the invention provided with a driving control apparatus for motors driving the respective joints.
Figure 12:
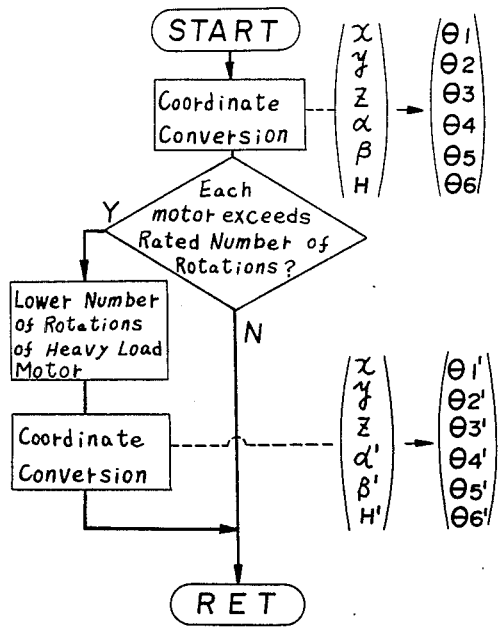
FIG. 12 is a flow chart of the driving control apparatus.

Referring to FIGS. 11 and 12, a drive-control unit for drive-controlling the motors $M_1$ through $M_6$ for driving the six joints is shown. The drive-control unit is provided surrounding an arithmetic and logic unit (ALU) with a detection means 14 which detects a load larger than the rated load of the respective motors $M_1$ trough $M_6$ when driving the respective joints $R_1$, $P_1$ through $R_3$, $P_3$, a motor output control means 15 for lowering the output of one or more motors of heavy load, on the basis of the detection result by the detection means 14, and a track correction means which corrects the moving path of each joint on the basis of motor output control to thereby maintain about constant the moving path of the utmost end of the wrist C.

Concretely, the detection means 14 compares a demanded load, for example, the number of rotations of the respective motors $M_1$ through $M_6$, with a comparison object by a setter 17, such as the rated number of rotations of the respective motors, thereby detecting whether or not the respective motors $M_1$ through $M_2$ are in condition of heavy loading.

The motor output control means 15 serves to reduce or restrict the output of the heavy load motor detected by the detection means 14 under the rated motor speed. The motor control means 15 mainly reduces the number of rotations of the heavy load motor itself, but may alternatively increase the number of rotations of the motor rotating at low speed, resulting in that the output of the heavy load motor may be reduced.

The track correction means 16 operates in such a manner that since the wrist C departs from the moving path predetermined by an input means 18, such as a keyboard, when the output of the heavy load motor lowers, the coordinate conversion is again carried out to correct the moving path of each joint, thereby maintaining the moving path of the utmost end of the wrist C on the predetermined moving path.

The aforesaid operation is as shown in the flow chart in FIG. 12.

In a first step, the coordinate conversion is carried out. In a second step, the detection means discriminates whether or not the number of rotations of the respective motors $M_1$ through $M_6$ exceeds the rated number of rotation. When one or more of the motors $M_1$ through $M_6$ rotate in number over the rated number, the motor output control means 15 lowers the number of rotations of the one or more heavy load motors more than the rated number, and then the correction means 16 again carries out the coordinate conversion, thereby correcting the utmost end of the wrist C onto the predetermined moving path.

Thus, the wrist C is maintained on the predetermined moving path.

Such construction can expand an operating region of the wrist C and elbow B at the arm 2 and maintain about constant the moving path of the utmost end of the wrist C, thereby reducing an excessive load demand to each motor.

Figure 13:
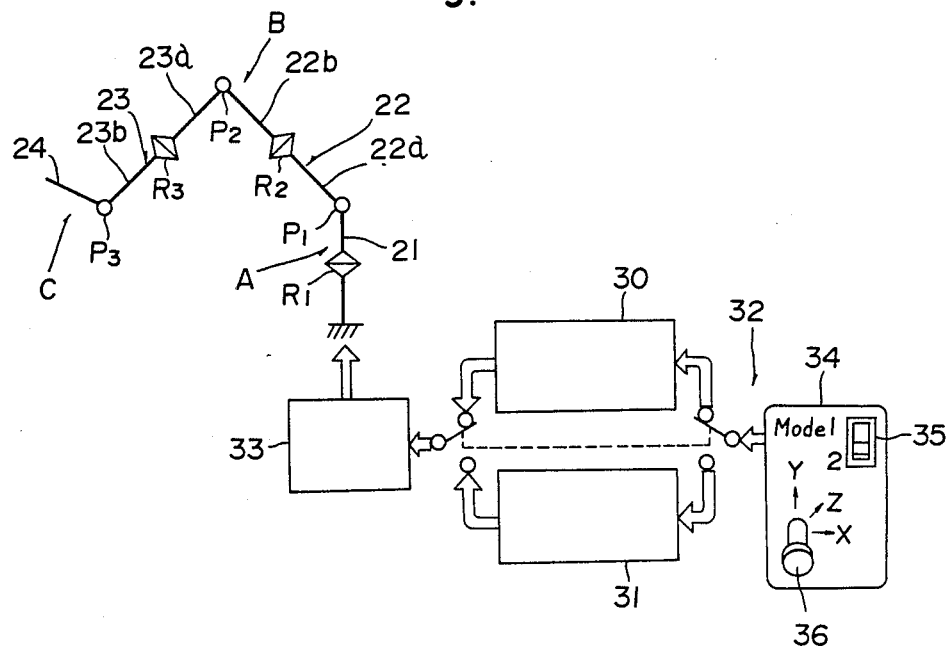
FIG. 13 is an illustration of the embodiment of the invention which is adapted to select the position and attitude control or the obstacle avoiding control.

Referring to FIG. 13, the arm 2 can select control of the wrist C in a position and attitude control mode or control of the elbow B in an obstacle avoiding control mode by changing the height of the elbow B. The robot is provided with a first control means 30 for controlling the driving of the respective joints $R_1$, $P_1$, $R_2$, $P_2$, $R_3$ and $P_3$ in the position and attitude control mode, a second control means 31 for controlling the driving of the respective joints in the obstacle avoiding mode, and a selection means 32 for selecting one of the first and second control means.

The first control means 30 serves to control the wrist C in the position X, Y and Z and attitude $\alpha$, $\beta$ and $\gamma$ optionally set in the three-dimensional space so that the coodinate conversion of x, y, z, $\alpha$, $\beta$, and $\gamma$ as a domain sets angles $\theta_1$ through $\theta_6$ of the respective joints.

The second control means 31 changes the height H of the elbow B to one factor $\gamma$ of the two factors $\alpha$ and $\beta$ for controlling the attitude of the wrist C so as to optionally swing the elbow B in the three demensional space. The coodinate conversion of making x, y, z, H, $\alpha$ and $\beta$ as the domain sets the angles $\theta_1$ through $\theta_6$ of the joints.

The respective joints $R_1$, $P_1$ through $R_3$, $P_3$ are driven on the basis of the angles $\theta_1$ through $\theta_6$ of the joints set by the first or the second means 30 or 31, through a drive control unit 33 for the motors $M_1$ through $M_6$ driving the joints respectively.

Meanwhile, th selection means 32 for selecting the first and second control means 30 and 31 is in association with, for example, a change-over switch 35 and a joy stick 36 provided at a teaching box 34 and switches the position and attitude control mode and the obstacle avoiding mode by operating the switch 35. Also, when the position and attitude control mode is switched to the obstacle avoiding mode, the joy stick 36 is turned to change the height of the elbow B and swing the elbow B, thereby avoiding the obstacle.

Accordingly, the first control means 30 can perform the normal position and attitude control, and the second control means 31, the obstacle avoiding control, only by using six control parameters. Moreover, the switching these control operations is selectively performable by the selection means 32.

Figure 14:
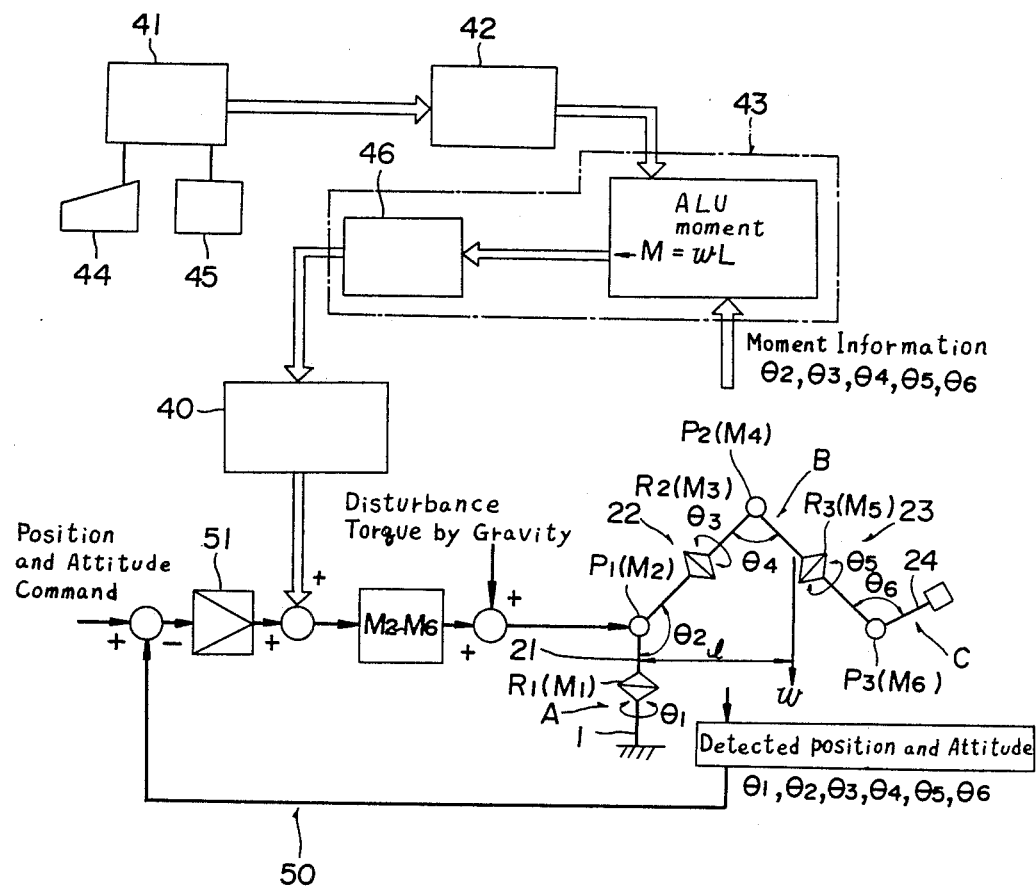
FIG. 14 is an illustration of the embodiment of the invention provided with a gravity compensation apparatus for eliminating the effect of the disturbance torque caused by the gravity acting on an arm.

Referring to FIG. 14, the robot constructed as abovementioned is provided with a gravity compensation apparatus for reducing gravity acting on the arm 2.

The wrist C at the arm 2, which holds an operating tool, such as a sealing gun, and controls the attitude thereof, may be affected by disturbance torque caused by the gravity to the arm 2, thereby making it impossible to assure the position control.

In FIG. 14, the gravity compensation apparatus comprises a drive control means 40 for compensating by driving torque of the motors for swinging the links 22, 23, and 24 the gravity acting thereon, an input means 41 for introducing loading weights of various objects, such as works or operating tools, at the wrist C, an output means 42 for controlling the output the driving control means 40 to the motors on the basis of a gravity signal from the input means 41, and a correction means 43 having an arithmetic and logical unit which computes a moment change on the basis of angles $\theta_2$ through $\theta_6$ at the joints $P_1$, $R_1$ through $R_3$, $P_3$ and correcting the output of the driving control means 40 to the motors.

Further concretely, the driving control means 40 gives to the respective motors $M_2$ through $M_6$ for driving the links 22, 23 and 24 a driving torque overcoming the disturbance torque caused by weight of each link 22, 23 or 24 and is connected to the input of the respective motors $M_2$ through $M_6$ at the output end of an amplifier 51 in a control system 50 as to the position and attitude of each motor. In addition, the control system 50 constitutes a feedback group using as a feedback quantity the position and attitude information actually detected by the links 22, 23 and 24 at a desired value of the command signal regarding the position and attitude of the respective links 22 through 24. The driving control means 40, when applied to, for example, the motor $M_2$ for swinging the second link 22 and corresponding to the first bending joint $P_1$, gives to the motor $M_2$ the driving torque enough to overcome the disturbance torque caused by weight of three links 22, 23 and 24. Hence, the motor $M_2$ can be driven to an extent of a predetermined angle (a swing angle $\theta_2$) of the joint $P_1$.

The input means 41 introduces from, for example, the keyboard 44 a numerical value of weight of a holding object at the wrist C and stores it in a memory 45.

The output means 42 changes a coefficient (when each link 22, 23 or 24 is assumed an arm, a moment value of the arm or a coefficient for changing the value) for obtaining an estimated value of the disturbance torque computed by the correction means 43 to be hereinafter detailed, on the basis of an input weight of the holding object given from the input means 41, resulting in that a corrected value of the input to the motor at the driving control means 40 introduced through a correction value computation element 46 at the correction means 43 is changed, thereby controlling the output of the driving control means 40 to the motor.

The correction means 43 computes by its arithmetic and logical unit the moment M applied to, for example, the joint $P_1$, that is the motor $M_2$, to be changed under five joint angles $\theta_2$, $\theta_3$, $\theta_4$, $\theta_5$ and $\theta_6$ at three links 22, 23 and 24, so that the moment M and the total weight W of the predetermined weight of each link and the weight of holding object introduced by the input means 41, compute the moment (M=WL, L: length of the link) applied to the motor $M_2$.

The correction value computation element 46 sets the correction value on the basis of the estimated value of disturbance torque decided with the moment computed by the arithmetic and logical unit, thereby controlling the output of the driving control means 40 to the motor $M_2$.

In addition, the joint angles $\theta_2$ through $\theta_6$ used for computing the moment by the arithmetic and logical unit may use calculated values or actually measured values detected by a potentiometer or the like disposed in each joint.

Thus, a worker can simply directly input a difference in a load when the wrist C holds the object or holds no object and a difference in weight of the held object by the input means 41, whereby there is no need to carry out troublesome weight detection. The output means 42 changes the estimated value of disturbance torque at the correction means 43 corresponding to the input difference of the load weight to control the output of the driving control means 40 to the motor. The correction means 43 controls the output of the driving control means 40 to the motor can perform gravity compensation of high accuracy with respect to the disturbance caused by the gravity corresponding to weight of the held object as well as compensation when the object is held or not.

Next, explanation will be given on an embodiment of construction of the joints at the aforesaid robot in accordance with FIGS. 15 and 16.

In FIG. 15 the first rotational joint $R_1$, first bending joint $P_1$ and second rotational joint $R_2$ are concretely shown, and in FIG. 16, the second bending joint $P_2$, third rotational joint $R_3$ and third bending joint $P_3$ are shown.

In FIG. 15, a first link 200 of the arm is cylindrical at its lower half, rotatably supported at the lower end to a base 100 through a bearing 201 serving as the first rotational joint $R_1$, and connected at the upper portion swingably to a second link 202 through a pair of first perpendicular shafts 203 serving as the first bending joint $P_1$, the second link 202 being supported swingably to the upper portion of first link 200 through bearings 204 serving as the second rotational joint $R_2$.

A first motor $M_1$ for driving the first rotational joint $R_1$ is fixed to the lower portion of the first link 200 and a drive gear 205 in association with the motor $M_1$ associates through intermediate gears 206 and 207 with a stationary gear 208 provided at the base 100, the motor $M_1$ rotatably driving the first link 200 through the bearing 201.

The first perpendicular shafts 203 project from a support cylinder 209 at a phase difference of 180°, are rotatably supported through bearings 210 to support members 211 formed at the upper portion of the first link 20, and rotatably support through bearings 216 and 217 a first gear 213 having a bevel gear 212 and a second gear 215 having a bevel gear 214.

At the lower portion of the first link 200 are mounted second and third motors $M_2$ and $M_3$ of variable speed type, driving shafts 218 and 219 of which associate with the first and second gears 213 and 215 through gear trains 220 and 211, so that the motors $M_2$ and $M_3$ separately drive the first and second gears 213 and 215.

The second link 202 is formed of a cylindrical member, fixedly supports at the lower end a rotary cylinder 223 supported rotatably to the support cylinder 209 through the bearings 204, and fixedly supports at the rotary cylinder fixing portion a ring gear 224 engageable with the bevel gears 212 and 214, the ring gear 224 and first and second gears 213 and 215 forming a differential gear mechanism.

Thus, the second and third motors $M_2$ and $M_3$ are driven at equal speed and the first and second gears 213 and 215 are rotated at equal speed, thereby allowing the second link 202 to swing around the first bending joint $P_1$, that is, the perpendicular shafts 203 with respect to the first link 200. Also, the second and third motors $M_2$ and $M_3$ are driven at different speed to give a rotational speed difference between the first gear 213 and the second gear 215, whereby the second link 202 can rotate around the axis of the support cylinder 209 through the second rotational joint, that is, the bearings 204 with respect to the first link 200.

Also, at the bottom of support cylinder 209 are supported fourth through sixth motors $M_4$, $M_5$ and $M_6$ for driving the second bending joint $P_2$, third rotational joint $R_3$ and third bending joints $P_3$ to be discussed below, first and second tubualr shafts 231 and 232 and a drive shaft 233 for the motor $M_6$ are inserted coaxially through the second link 202, the first shaft 231 associating with the motor $M_4$ through gears 234 and 235, the second shaft 232 associating with the motor $M_5$ through gears 236 and 237.

Now, referring to FIG. 16, a first interlocking gear 238 supported to the upper end of the second link 202 is interlocked with the upper end of the first interlocking shaft 231, a second interlocking gear 239 is interlocked with the second interlocking shaft 232, and a bevel gear 240 is mounted on the drive shaft 233.

A pair of support members 202a and 202b are mounted on the upper end of the second link. 202 to support a second perpendicular shaft 241 serving as the second bending joint $P_2$. Onto the second perpendicular shaft 241, a front half 243a of the third link 243 is supported rotatably through bearings 242 and a connector 244 fixed to the lower end of the front half 243a, third and fourth gears 245 and 246 engageable with the second interlocking gears 238 and 239 being supported rotatably onto the second shaft 241.

A rear half 243b of the third link 243 supports at the upper end a rear half 243b of the link 243 rotatably through a bearing 247 serving as the third rotational joint $R_3$, and fixedly supports at the lower end a tubular interlocking shaft 250 provided with a ring gear 248 which is engageable with the third and fourth gears 245 and 246 and is supported rotatably to the front half 243a of the second link 202 through bearings 249.

The second perpendicular shaft 241 rotatably supports at a lengthwise intermediate portion a gear 251 engageable with the bevel gear 240 at the drive shaft 233, and a solid interlocking shaft 253 having a bevel gear 252 engageable with the gear 251 is rotatably inserted axially through the interlocking shaft 250.

The interlocking shaft 253 perforates at its upper end through the rear half 243b of the third link 243 and supports at the projecting end a gear 254.

The rear half 243b rotatably supports a third perpendicular shaft 255 serving as the third bending joint $P_3$, a fourth link 256 is mounted on the third perpendicular shaft 255, and the perpendicular shaft 255 interlocks with the gear 254 through the gears 257, 258 and 259.

Thus, the motors $M_4$ and $M_5$ rotatably drive the gears 245 and 246 through the first and second interlocking shafts 231 and 232 to allow the third and fourth gears 245 and 246 to rotate at equal speeds, whereby the third link 243 can swing around the second bending joint $P_2$, that is, the bearings 242 with respect to the second link 202. Also, the motors $M_4$ and $M_5$ give a rotational speed difference to the third and fourth gears 245 and 246, thereby enabling the rear half 243b of the third link 243 to be rotated around the third rotational joint $R_3$, that is, the bearing 247 with respect to the front half 243a.

The sixth motor $M_6$ is driven to allow the fourth link 256 to swing around the perpendicular shaft 255 through the interlocking shaft 233, gears 240, 251 and 252, and interlocking shaft 253, the third and fourth gears 242 and 246 and ring gear 248 contituting a differential gear mechanism as the same as that with the first and second gears 213 and 215 and ring gear 244. The characteristic of such differential gear mechanism is used to allow the rear half 243b of the third link 243 to rotate with respect to the front half 243a thereof and the third link 243 to swing around the second perpendicular shaft 241 with respect to the second link 202.

Thus, two motors $M_4$ and $M_5$ operate in cooperation with each other to enable the bending and rotation, thereby reducing a load on each motor $M_4$ or $M_5$ and expecting miniaturization thereof.

Accordingly, one differential gear mechanism can materialize the rotatinal and bending joints operable simultaneously, whereby the robot is small-sized as a whole, simple in construction, and inexpensive to produce.

While an embodiment of the invention has been shown and described, the invention is not limited to the specific construction thereof, which is merely exemplary in the spcification rather than is defined.

What is claimed is:

1. An industrial robot comprising a support base and an arm supported thereto, said arm comprising at least three rotational joints each having an axis extending lengthwise of said arm and being rotatable around said axis, at least three bending joints each having a perpendicular axis extending perpendicularly to the lengthwise direction of said arm and swingable around said perpendicular axis, at least first through fourth links forming a wrist portion, an elbow portion and a trunk portion of said arm, said rotational joints and bending joints being disposed alternately with each other, and drive means for driving said joints so that said arm operates to avoid obstacles by changing a height of said elbow portion relative to a horizontal reference while maintaining the position and direction of the wrist portion, said drive means being responsive to a command signal from a first command means for driving said arm to avoid an obstacle.

2. An industrial robot according to claim 1, wherein said first rotational joint is disposed between said support base and said first link, said bending joints are disposed between respective links, and said second and third rotational joints are disposed at said second and third links respectively.

3. An industrial robot according to claim 2, wherein said first link is provided with a first perpendicular shaft extending perpendicularly to the lengthwise direction of said first link and a support cylinder swingable around said perpendicular shaft, said second link being supported rotatably to said support cylinder and provided with a ring gear, said first perpendicular shaft being provided with first and second gears engageable with said ring gear so as to constitute together with said ring gear a differential gear mechanism, said first link being provided with a pair of adjustable speed motors in association separately with said first and second gears and forming part of said drive means, so that said motors are speed-controlled to allow said second link to swing around said perpendicular shaft and to rotate with respect to said support cylinder.

4. An industrial robot according to claim 3, wherein said second link is provided with a second perpendicular shaft perpendicular to the longitudunal direction of said second link, said third link being supported swingably to said perpendicular shaft and provided with a first half and a rear half supported rotatably to said first half, said rear half being provided with a ring gear, said second perpendicular shaft being provided with third and fourth gears which are engageable with said ring gear and constitute together therewith a differential gear mechanism, said second link being provided with a pair of adjustable speed motors in association independently with said third and fourth gears and forming part of said drive means, so that said motors are speed-controlled to allow said third link to swing around said second perpendicular shaft with respect to said second link and to allow said rear half of said second link to rotate with respect to said first half.

5. An industrial robot according to claim 1, further comprising a change means for changing a command signal from said first command means.

6. An industrial robot according to claim 1, wherein said arm can control the position and attitude of said wrist portion and the turning of said elbow portion at said arm, said drive means including motors for driving said joints at said arms, said arm further comprising means for detecting a load more than a rated load on a said motor, and means for reducing an output of a motor having a load greater than said rated load on the basis of the detection result by said detection means and for adjusting the operation of the remaining motors so that a set operation path of an utmost end of said arm is maintained substantially constant.

7. An industrial robot according to claim 1, further comprising a first control means including a second command means for controlling said drive means in a mode of controlling the position and attitude of said arm, a second control means which includes said first command means for controlling said drive means in a mode of avoiding said obstacle by said arm, and a selection means which selects said first or second control means.

8. An industrial robot according to claim 1, further comprising means for adjusting said drive means to compensate operational movement of said arm for the effects of gravity.

* * * * *